Patented Mar. 7, 1950

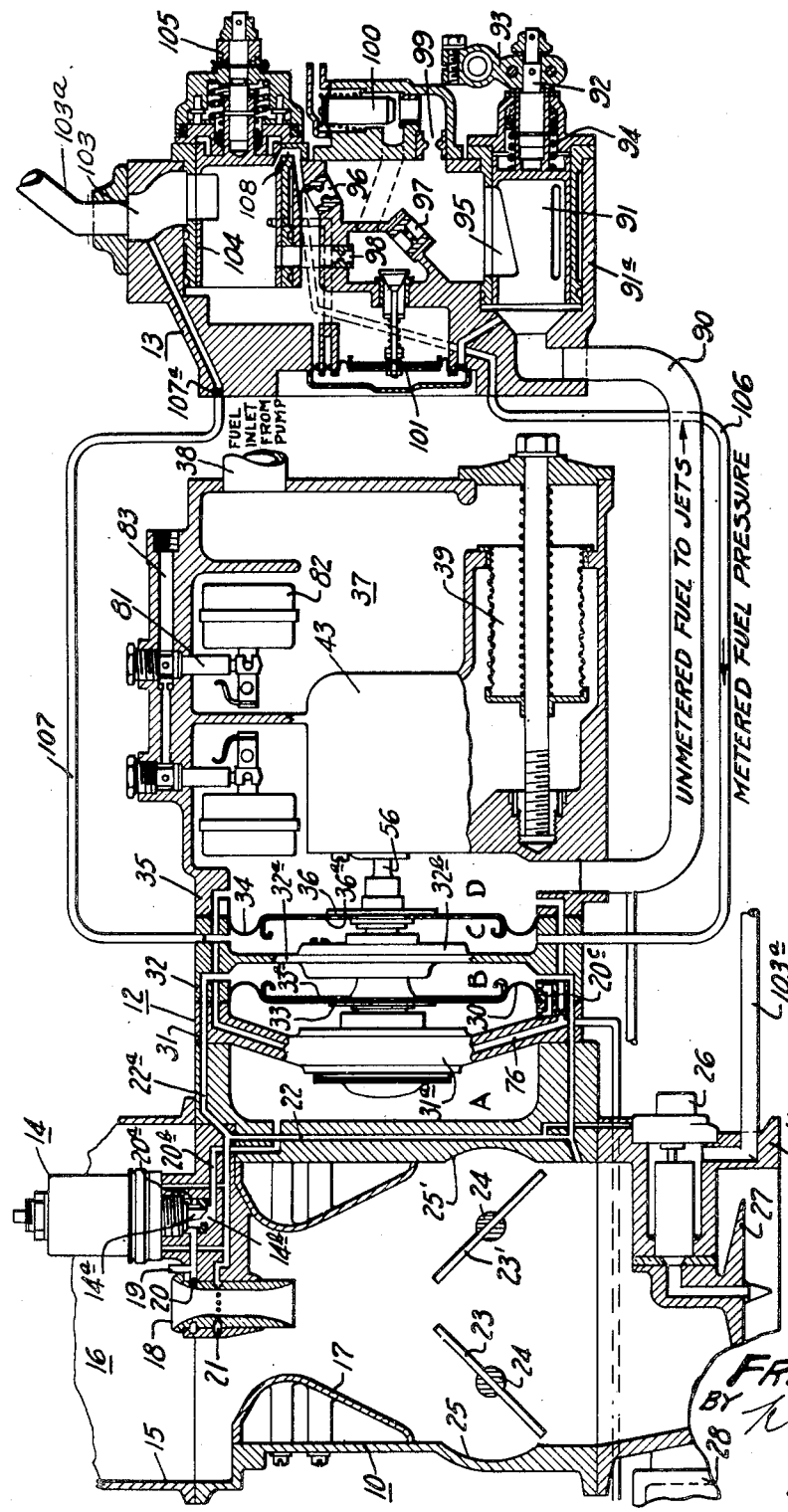

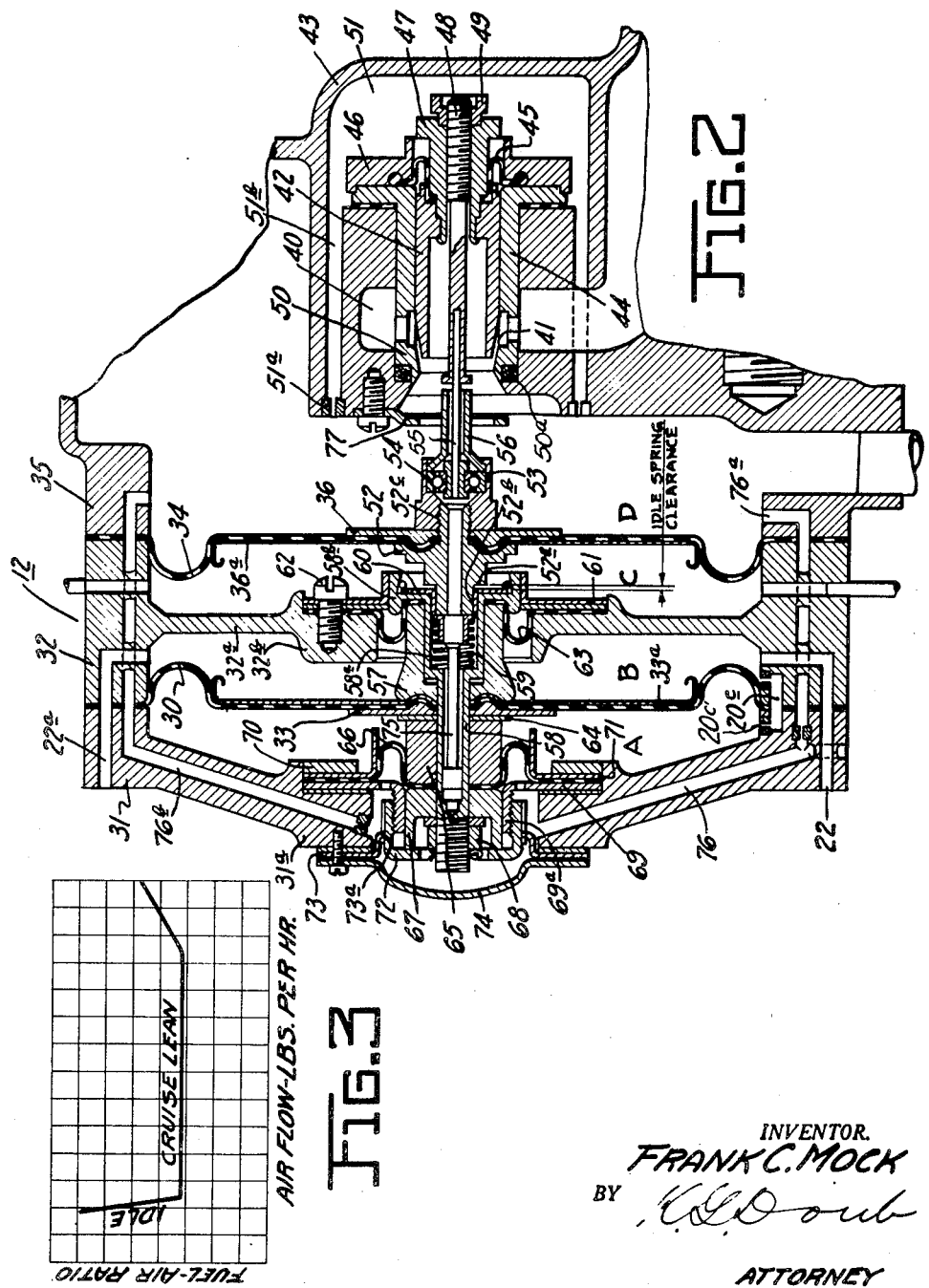

2,500,088

UNITED STATES PATENT OFFICE 2,500,088

CHARGE FORMING DEVICE

Frank C. Mock, South Bend, Ind., assignor to Bendix Aviation Corporation, South Bend, Ind., a corporation of Delaware Application May 31, 1944, Serial No. 538,153

14 Claims. (Cl. 261—69)

This invention relates to charge forming devices or carburetors for internal combustion engines, and is particularly concerned with improvements in carburetors of the injection or pressure feed type such as disclosed in my prior copending U. S. application Serial No. 202,206, filed April 15, 1938, patented December 11, 1945, No. 2,390,658, and now commonly known as the "Stromberg injection carburetor."

In carburetors of this type, the metering pressure across the jets and hence the rate of fuel flow is regulated in relation to power requirements by impressing an air metering force on an air diaphragm which is balanced for a given air flow by an opposed fuel metering force impressed on a fuel diaphragm, the resultant differential of these forces controlling the opening and closing movements of a fuel valve which admits fuel to the metering jets. The fuel metering force is controlled by the air metering force which in turn is controlled by and is proportional to the Venturi-to-air-scoop differential in the Venturi system of the carburetor. In a carburetor having a venturi, the pressure drop across the latter is proportional to the velocity squared times air density, and when the throttle is moved toward closed or partly-closed position, the velocity of the air flowing through the venturi is reduced which correspondingly reduces the air metering force and the fuel metering differential pressure or metering head, and likewise, as the density decreases with a gain in altitude, the velocity increases, which would result in a corresponding increase in the air metering force in the absence of a suitable density-responsive control element. This complicates the problem of metering at extremely low air flows without affecting the accuracy of metering in the normal power ranges. To avoid "leaning out" to a point of engine failure, an idle spring is provided which acts on the fuel valve to hold the latter open sufficiently to give a slight enrichment at extremely low air flows, both full and part throttle, and to enable a richer mixture at idling speeds. The idle spring adds a certain increment to the air metering force which auxiliary force is at a maximum at minimum air flow and tends to diminish as the air flow increases and the valve moves in a direction away from the spring. By using a relatively stiff small deflection spring, the diaphragm and fuel valve assembly has been made to move completely away from the spring at high air flows, whereupon the air metering force alone is in control.

The organization and construction of the fuel valve and diaphragm assembly and coacting idle spring as heretofore used in Stromberg injection carburetors has proved effective under all conditions of service over a period of years, but the more exacting requirements of modern aircraft and increased altitude flying range has presented problems which could not be satisfactorily met, particularly for engines having certain characteristics. Thus it was difficult to restrict the influence of the idle spring to the idling range or to predetermined limits of low air flows, resulting in unnecessary enrichment in the early stages of the cruising range or at air flows bordering on the idle range; the metering head produced by the action of the spring was more or less unstable; the inability to obtain a more constant metering head at low air flows called for a Venturi system of limited flow capacity which correspondingly advanced the point on the air flow curve where the velocity reached "critical"; the spring was difficult to adjust properly in relation to mixture ratios, and likewise, it was difficult to make the travel of the throttle-controlled idle valve properly conform to the action of the idle spring; and the parts presented other problems in manufacture, assembly and maintenance.

An object of the invention, therefore, is to improve the fuel metering characteristics of carburetors of the injection or pressure feed type, particularly under low air-flow conditions.

Another object is to simplify the tasks incidental to design, manufacture and maintenance of carburetors.

A further object is to reduce the sensitivity of the throttle over the idling and low power range of throttle movement.

The foregoing and other objects and advantages will become apparent in view of the following description taken in conjunction with the drawings, wherein:

Figure 1 is a view in sectional diagram of an injection carburetor embodying the invention;

Figure 2 is an enlargement of the fuel valve and coacting diaphragm assembly of Figure 1; and Figure 3 is a chart illustrating low air-flow metering characteristics of the carburetor.

First considering Figure 1, the carburetor therein illustrated consists of an assembly made up generally of the following parts: a throttle body 10, an adaptor 11, a regulator unit 12, a fuel control body 13 and an automatic mixture control unit 14 containing a density-responsive bellows, not shown, which actuates a needle valve 14a to control valve port 14b.

The throttle body is adapted for mounting at the discharge end of an air scoop 15 defining an air-intake passage 16 which directs air into the inlet to the carburetor, the inlet in the present instance being of generally rectangular configuration and having therein a main venturi 17 and one or more small or boost venturis 18. Adjacent the boost venturi are the impact tubes 19 on which scoop pressure is imposed and is communicated by way of passage 20, valve chambers 20a, port 14b and passage 20b to chamber A of the air section of the regulator.

Venturi suction is registered in annular chamber 21 of the boost venturi and communicated through passages 22, 22a to chamber B of the regulator.

At their lower extremities, chambers A and B are connected by a passage 20c having mixture control bleeds 20c' therein which become increasingly effective as the pressure in chamber A is reduced due to the action of the needle valve 14a.

A pair of coacting throttles 23, 23' are rotatably mounted on shafts 24 posterior the main venturi, the said shafts being so located with respect to one another and the adjacent side walls of the carburetor barrel that the leading edges of the throttles come together when in closed position while the trailing edges thereof substantially abut the sides of the barrel within the confines of a pair of arcuate recesses 25, 25'. These arcuate recesses extend transversely of the rectangular barrel and are of such depth and chordal length as to substantially seal the outer sides of the barrel against passage of air during a predetermined part of the initial opening travel of the trailing edges of the throttles. By this means sensitivity of the throttles is reduced since air can pass between the adjacent leading edges only of the throttles during idling and initial acceleration movement of the throttles, affording better control and tie-up with the idle valve and idling system, to be described.

The adaptor 11 carries a discharge nozzle 26 which injects fuel into the air stream posterior the throttles; it may be set to open under a predetermined pressure of say ten or fifteen pounds and discharge fuel over a distributor bar 27. The adaptor also carries an accelerator pump 28 for giving an initial enrichment when the throttle is moved toward open position and avoid lag or delay in acceleration, as is well understood in the art.

The regulator 12 houses the fuel valve assembly and coacting parts for actuating the same; it is in the form of a series of castings defining air pressure chamber A, air depression chamber B, metered fuel chamber C and unmetered fuel chamber D; also a relatively large fuel chamber housing the fuel strainer, vapor separator assembly and fuel valve head assembly. Chambers A and B are separated by flexible diaphragm 30 which is securely anchored at its outer edge between end spider ring 31 (having a hub portion 31a) and annular member 32 (having a center disc or wall 32a and hub 32b) and is engaged centrally on one side by a relatively rigid plate 33 (connected to the fuel valve assembly, to be more specifically described in connection with Figure 2) and on the opposite side by a thin backing plate 33a. Chambers C and D are separated by a flexible diaphragm 34 which is securely anchored at its outer edge between the annular member 32 and fuel chamber housing or casing 35, and is engaged centrally on one side by plate 36 similar to plate 33 and on the opposite side by a thin backing plate 36a similar to plate 33a. Chambers B and C are separated by the rigid wall 32a and hub 32b of the annular member or casting 32.

The casing 35 defines a main fuel chamber 37 to which fuel is supplied under pump pressure through inlet 38 and thence passes through strainer 39 to valve-inlet chamber 40 (see Figure 2) and from the latter through valve port 41 to chamber D of the regulator. Port 41 is controlled by fuel valve 42 forming part of a valve assembly best shown in Figure 2 and which will now be described.

The head assembly for valve 42 is supported by a housing 43 and consists of flanged sleeve 44 in which the valve 42 is adapted to slide. A sealing diaphragm 45 has its outer edge secured between end member 46 and the flange of sleeve 44 and its inner edge anchored or secured between the rear end of the valve and stem nut 47, the latter being threaded on the right-hand end of valve stem 48 and held against displacement by nut 49. A valve seat 50 is fixed in a recess provided therefor in the housing 43, and a sealing ring 50a insures against leakage of fluid around or past said seat. Should the diaphragm 45 rupture and fuel leak into chamber 51, the flow of fuel past the valve 42 into chamber D will be limited by small restrictions 51a placed in balance channels 51b.

The air diaphragm 30 and fuel diaphragm 34 are connected to the fuel valve in a manner such that one is permitted a predetermined range of movement without affecting the other, but when this range is exceeded, the diaphragms act in unison to control the valve.

The fuel diaphragm is clamped at its center between plate 36 and member 52 which is stepped to provide a stop in the form of a radial flange 52a and a guide nose 52b. At the right-hand side of the diaphragm the member 52 is formed with a threaded extension 52c which engages in a bushing 53 adapted to receive and retain a bearing 54. The valve stem 48 is fixed on a pin 55 which projects through a shield 56 and is fixed at its left-hand end in the hub of the bearing 54. Shield 56 is fixed at its left extremity in bushing 53. By interposing the bearing 54, valve 42 may be adjusted with respect to its seat without danger of rupturing or straining any of the diaphragms.

The air diaphragm is clamped at its center between the plate 33 and a bushing 57 through which projects a hollow tie rod and guide bushing 58, enlarged for a portion of its length to provide a guide sleeve and chamber 58a in which is mounted a coil spring 59, which may be termed an "idle spring" since one of its functions is to maintain a substantially constant metering head when the air metering force falls below a certain predetermined value. This spring is of relatively low spring rate, and by utilizing a weak spring of relatively great length with respect to its short throw on the fuel valve 42, the pressure head during such throw may, for all practical purposes, be considered constant. Its strength should, however, be such as to provide the required idling enrichment for the particular type of engine in which the carburetor may be installed. The manner in which the spring operates will be more fully hereinafter described.

At its right-hand extremity, the hollow bushing 58 is extended radially and terminates in a hub flange 58b, which is undercut and receives a bearing 60 removably held in place by a resilient split ring or other suitable means, the guide portion or nose 52b of the member 52 projecting into the said bearing 60 for limited longitudinal sliding movement in a manner to be described.

The hub flange 58b is centered with respect to the hub 32b by means of flanged disc 61 secured in a recessed portion of said hub as by screws 62. A sealing diaphragm 63 is also secured to the hub 32b at its outer edge and at its inner edge is clamped between the bushing 57 and a bead formed on the rear of the hub flange 58b.

The air diaphragm 30 is clamped at its center between plate 33 and bushing 57, and to the left of said plate on the stem of the tie rod and bushing 58 is a shim 64, spacer bushing 65, sealing and balance diaphragm 66 and guide bushing 67, the left-hand end of said stem portion of the tie rod and bushing being threaded to receive lock nut 68. A bearing 69 is secured at its outer edge in a recess formed in hub 31a and is formed with an externally-threaded axially projecting bearing sleeve or cylinder 69a which slidingly receives the guide bushing 67. The outer edge of diaphragm 66 is also secured in the recess of hub 31a over bearing 69 by means of clamp ring 70, a shield 71 being interposed between said plate and diaphragm and having an axially projecting portion defining the peripheral boundary of the diaphragm fold.

A stop member in the form of a deeply-dished nut 72 is adjustably threaded on sleeve 69a; it is held in fixed adjusted position by a locking plate 73 which is secured to the exterior wall of hub 31a and has its central portion formed with a plurality of spring fingers or spurs 73a which engage in spline grooves provided on the exterior surface of sleeve 69a. An end cap 74 is detachably secured over the end piece 73 and is held in place by screws or like fastening elements which also project through plate 73.

Within the hollow stem portion of the central tie rod and guide bushing 58 is an idle spring guide in the form of a stem 75 which at its right-hand extremity is fixed in the member 52 and at its left extremity is formed with an enlargement having a sliding fit in said hollow stem portion. The idle spring 59 encircles a bushing disposed on an enlargement of the stem 75 in the chamber 58a.

The diaphragms 63 and 66 are of equal area and their effects are balanced out or cancel one another. The passage indicated at 76 places the diaphragm 66 in pressure communication with a piston chamber in the accelerator pump 28. When the piston is actuated by the throttle or other means, pressure is applied to diaphragm 66 and the fuel valve 42 is opened to correspondingly increase the metering pressure. A balance channel 76a having a restriction therein communicates passage 76 with fuel chamber D, and another channel 76b also having a restriction therein vents the chamber of diaphragm 66 to said fuel chamber.

The part indicated at 77 is a baffle for diffusing fuel entering chamber D and thus reduce the tendency to form vapor in the system.

Reverting now to Figure 1, the chamber 37 in which fuel is received from the pump is provided with a vapor separating system including vent plugs 81 having vents therein controlled by float valves 82 which open the vents when vapor collects sufficiently to lower the fuel level adjacent the float to a point at which the float opens the valve 82. The vapor so vented is passed through passage 83 back to the fuel tank, not shown.

The fuel control unit, generally indicated at 13, is connected to the regulator 12 by means of fuel passage 90; it contains idle valve 91 rotatably mounted in a casing 91a and provided with a stem or shaft 92 and arm 93 having a connection with the throttle linkage, not shown, a spring 94 preventing play in the valve mounting. Casing 91a defines a chamber 95 which receives the initial flow of fuel from conduit 90; and beyond this chamber are the metering jets, four in number in the present instance, viz: auto-lean jet 96, power enrichment jet 97, auto-rich jet 98 and derichment jet 99, the latter being controlled by derichment valve 100 forming part of a water metering system, not shown, and constituting no part of the present invention. A power enrichment valve 101 is provided and is operated by a diaphragm subjected to the differential between metered and unmetered fuel, the valve opening when the fuel metering force attains a certain value. Fuel to valve 101 and auto-rich jet 98 flows through jet 97; the said valve constituting the metering element during the early part of the power enrichment range, and the jet 97 taking over at higher power flows.

The metering jets are located in flow channels which open into the fuel discharge conduit 103 through a manual mixture control valve 104 provided with a handle 105. A fuel line 103a conducts fuel from discharge conduit 103 to the discharge nozzle 26.

Metered fuel pressure is communicated back to chamber C by means of duct 106, and said chamber is vented of air or vapor by means of duct 107 discharging into conduit 103 and having a suitable restriction 107a therein.

The operation, in general, is as follows:

When the engine is in operation, air is drawn into the air scoop or induction passage 16 and thence through the venturis 18 and 17, and a differential pressure is created between the throat of venturi 18 and the air inlet which, at constant entering air density, is proportional to the square of the quantity of air flowing. These respective pressures are transmitted to chambers A and B and create a net force on diaphragm 30 tending to open the fuel valve 42. This force is termed the "air metering force." If this force were unopposed, the valve 42 would move to its full open position; but when the valve opens, fuel under pressure flows into unmetered fuel chamber D and through conduit 90 to the fuel control body, where it flows through any one or more of the respective metering orifices, depending upon the position of the manual control valve 104, and thence to the discharge nozzle 26 through conduit 103 and fuel line 103a, from which it is discharged under a nozzle pressure of, for example, five pounds into the air stream flowing to the engine. Chamber D is subjected to unmetered fuel pressure and chamber C to metered fuel pressure, and the differential between these respective pressures acts upon diaphragm 34 tending to move the fuel valve 42 to the left, or in a direction to close the valve. This force is termed the "fuel metering force" and it opposes the air metering force. The valve 42 is thus caused to adjust itself to a point of equilibrium such that the differential pressure across the fuel metering orifices is equal to the differential between the air inlet and venturi, whereby constant fuel-air proportioning is maintained. As engine speed is decreased, the rate of air flow through the venturi is decreased, thereby decreasing the differential pressure acting on diaphragm 30, causing valve 42 to move toward closed position and thus decreasing the fuel flow to compensate for decreased rate of air flow. Thus the air metering force controls the fuel metering force.

Since the Venturi-to-air-scoop differential pressure increases for a given rate of mass air flow, upon a decrease in entering air density, the differential pressure across diaphragm 30 will tend to increase, thereby increasing the fuel flow and enrichening the mixture. In order to prevent such enrichment with increase in altitude, the calibrated bleed 20c between chambers A and B is provided, said bleed being substantially ineffective to vary the pressure in these chambers at such times when the needle valve 14a is in open position, as at ground level, but becoming increasingly effective in reducing the pressure in chamber A as said needle progressively restricts said passage with increase in altitude. Thus, for any given mass air flow, the needle valve 14a will so restrict passage 20, 20b with variation in altitude that the differential in the pressures in chambers A and B will remain constant notwithstanding that the differential in the pressures at venturi 18 and impact tubes 19 increases with a decrease in entering air density. By this means automatic altitude compensation is obtained.

The Venturi differential pressure for a given size venturi and entering air density will normally vary substantially as the square of the velocity, but experiments have shown that this law does not hold true in the extremely high velocity ranges, such as may occur at wide open throttle when the density decreases to a point equivalent to an altitude of 25,000 or 30,000 feet, since at these velocities the Venturi differential pressure increases at a rate greater than the square of the air velocity, thereby producing an unproportionate enrichment of the mixture in these ranges. Again, as velocity reaches critical for the small venturi, (which may occur at the speed of sound) but does not reach critical for the main venturi, the depression created by the small venturi attains a maximum, and subsequent increase of flow through the large venturi to its critical flow rate increases the total air flow without increasing the fuel flow. Thus the mixture in this range grows leaner with altitude.

It follows, therefore, that the larger the area of the Venturi system, the higher will be the quantity of air supplied to the engine before the velocity attains a value at which an unbalance in the fuel-air ratio takes place. Obviously, however, the size of the venturi affects the air metering force at low air flows, since the smaller the Venturi area, the higher will be the velocity for a given volume (velocity equals volume divided by area). Thus, it is of advantage to have an idling or low air-flow metering system which will function with a venturi of greater area than those theretofore employed for a given design of carburetor.

Considering now the idling system, or the manner in which the fuel metering head is regulated at extremely low air flows, it will be noted from Figure 2 that the fuel diaphragm 34, fuel valve 42, member 52 and guide stem 75 are assembled to move in unison as a single unit; and likewise the air diaphragm 30, bushings 57, 65 and 67, member 58, sealing diaphragms 63 and 66 and associated parts are also assembled to move as a single unit. However, when the air diaphragm moves a certain distance to the right, it takes up the clearance between the shoulder 52a and the liner 60, and from there on both the air and fuel diaphragms and connected fuel valve assembly act as a single unit.

When the pressure differential between the air scoop and the boost venturi drops to a predetermined value, the air diaphragm 30 moves to the left until the bushing 67 contacts the stop 72. At this time, the fuel valve 42 is held open by spring 59 sufficiently to produce a metering head consistent with the desired idling mixture, which head may, for example, be equivalent to between one and two inches of gasoline. This is the position of the parts shown in Figure 2. The idle spring 59 then substitutes a mechanical metering force for that normally provided by the diaphragm 30 up until the time the pressure in chamber A, or the differential across diaphragm 30, and the corresponding fuel differential pressure across diaphragm 34 increase to a point where the air and fuel diaphragms move toward each other and take up the clearance between liner 60 and shoulder 52a, whereupon the fuel and air diaphragms and coacting parts act as a unit, at which time the effect of the spring 59 is completely eliminated and is no longer effective for increasing the fuel metering differential relative to the air metering differential. A constant minimum idle head is thus provided having no effect on the metering when the air metering head exceeds said minimum head. Stated in another way, at extremely low air metering pressure, such as results at engine idling speeds, the idle spring 59 expands in the chamber 58a and opens the fuel valve until a fuel metering force equal to the spring force is obtained. As the air flow is increased, the air metering force acting on the air diaphragm compresses the idling spring until the liner or bushing 60 contacts the shoulder 52a. The chamber 58a will accommodate a spring of such low rate that up until this time, the valve 42 will not move, since the original force applied to the valve by the idle spring remains practically constant throughout spring compression.

The idling range may vary for different types of engines, and consequently the idle valve 91 is adapted for adjustment to conform to the required range of idle movement of the throttle. During this range of idle movement, the metering head as determined by spring 59 will remain substantially constant, metering during this range being through the variably restricted idle valve orifice.

Figure 3 illustrates the curve characteristic obtainable by the improved idling system; note that the fuel-air ratio during the idling period is substantially constant, and that when the throttle opens to the cruising range, the metering action is taken over by the air metering force at a definite point on the curve. This point may be advanced or retarded by providing an idling spring of predetermined spring force or rate and/or by adjusting the stop 72. Since the enrichment provided by the idling spring may be held back of or definitely stopped at the cruising range, economy in fuel consumption is obtained over idling systems wherein the enrichment effect of the idling spring carries on into said range. With the type of idling spring wherein the spring influence is carried on into the cruising range, excessive enrichment is experienced in the intermediate range between idling and cruising, with a consequent loss in economy.

The idle spring clearance should always be greater by a slight increment than the fuel valve clearance to permit the fuel valve to close when the manual control valve 105 is turned to idle cut off and the fill valve channel, indicated at 108, is closed thereby allowing the unmetered fuel pressure in chamber D to build up sufficiently to force the fuel diaphragm 34 to the left to fully close valve 42. When the engine stops running and the source of fuel under pressure is cut off, the valve 42 will move back to a slightly open position as shown in Figure 2.

This type of idling system permits the use of a larger venturi, or a Venturi system of greater flow area, since the idling spring in connection with the independently movable diaphragm assembly permits a substantially constant metering head over a relatively wide range of low air flows. Also the spring is more stable at low suctions than the leaf or cantilever type of idle spring heretofore used in injection carburetors, and the arrangement of the assembly simplifies the manufacturing problem. The parts may be adjusted with relative ease, since in order to position the stop 72 it is only necessary to remove the cap 74 and latch plate 73.

It will be obvious that by modifying the structure to a certain extent, different operating characteristics may be produced. Thus in addition to the spring 59, another spring could be provided to coact therewith and interposed between the fuel diaphragm and the bearing member 61. In this manner the mechanical pressure head could be distributed over a plurality of springs. However, actual practice has demonstrated that by selecting a spring 59 of suitable length and spring rate and by providing a chamber 58a of proper dimensions to receive the spring, the idling head obtained is substantially constant throughout the entire idling range, and the spring created enrichment is completely eliminated at the desired point on the air flow curve. Also, fuel and air diaphragms of different relative areas may be used. For example, the fuel diaphragm may be made smaller than the air diaphragm so as to obtain a higher head for a given suction or differential pressure across the air diaphragm. Again, the various diaphragms, fuel valve and co-acting pressure chambers are quite frequently arranged in a manner different from that shown, to accommodate engines having certain characteristics, for simplification and for convenience in manufacture, and the improved idling system may be readily incorporated in such arrangements by those skilled in the art, once a knowledge thereof is obtained from the instant disclosure, without the exercise of the inventive faculties.

The foregoing and other minor changes in structure and design may be adopted without departing from the spirit and scope of the invention as defined by the appended claims.

I claim:

1. In a pressure-feed carburetor wherein a fuel valve is controlled by movable pressure-responsive elements at least one of which is subjected to an air flow differential pressure acting in a direction to open the valve and another of which is subjected to a fuel flow differential pressure acting in a direction to close the valve, means connecting said elements to said valve for movement in unison therewith throughout a range of air-intake flows exceeding a certain value but permitting independent movement of the fuel element with respect to the air element at air flows below such value, and resilient mechanical means arranged to automatically substitute for the air metering force when the air flow drops below said given value, said resilient mechanical means being rendered ineffective when said elements are connected for movement in unison.

2. In combination with an engine having an air-intake system and a fuel supply system, a pressure-feed carburetor wherein a fuel valve is controlled by coacting diaphragms or like pressure-responsive elements at least one of which is subjected to an air metering force created by Venturi means in the air-intake system and another of which is subjected to a fuel-metering force created by the differential between metered and unmetered fuel in the fuel supply system; means connecting said diaphragms to said valve for movement as a unit therewith throughout a range of air-intake flows exceeding a certain value but permitting relative movement between the diaphragms at air flows below such value, and a spring of relatively low spring rate arranged to oppose the fuel diaphragm when the air flow drops below said value.

3. In combination with an engine having an air-intake system and a fuel supply system, a pressure-feed carburetor wherein a fuel valve is controlled by coacting diaphragms or like pressure-responsive elements one of which is subjusted to an air-metering force acting in a direction to open the valve and created by Venturi means in the air-intake system and another of which is subjected to a fuel-metering force acting in a direction to close the valve and created by the differential between metered and unmetered fuel in the fuel supply system; means connecting said diaphragms to said valve for movement as a unit therewith throughout a range of air-intake flows exceeding a predetermined value but permitting relative movement between the diaphragms at air flows below such value, means limiting movement of the air diaphragm in a direction toward valve-closing position, and a spring of relatively low spring rate arranged to oppose the fuel diaphragm when the air diaphragm reaches its limit of movement in said direction.

4. In combination with an engine having an air-intake system and a fuel-supply system, a pressure-feed carburetor wherein a fuel valve is controlled by coacting diaphragms or like pressure-responsive elements one of which is subjected to an air-metering force acting in a direction to open the valve and created by Venturi means in the air-intake system and another of which is subjected to a fuel-metering force acting in a direction to close the valve and created by the differential between metered and unmetered fuel in the fuel supply system; means extending axially of the diaphragms connecting the latter to one another and to the fuel valve, said connecting means being constructed in a manner such that when the air metering force drops below a predetermined value the fuel diaphragm is permitted to move independently of the air diaphragm, and a coil spring of low spring rate arranged to oppose the fuel diaphragm during such range of low air-flow control.

5. In combination with an engine having an air-intake system and a fuel-supply system, a pressure-feed carburetor wherein a fuel valve is controlled by coacting diaphragms one of which is subjected to an air-metering force acting in a direction to open the valve and created by Venturi means in the air-intake system and another of which is subjected to a fuel-metering force acting in a direction to close the valve and created by the differential between metered and unmetered fuel in the fuel supply system; means extending axially of the diaphragms connecting the latter to one another and to the fuel valve, an idle spring, said connecting means including a member having relative movement with respect to the air diaphragm connected to the fuel diaphragm and arranged to abut said spring, means connected to the air diaphragm backing up the spring, and means limiting movement of the backing-up means in a valve-closing direction.

6. In combination with an engine having an air-intake system and a fuel supply system, a pressure-feed carburetor wherein a fuel valve is controlled by a pair of diaphragms one of which is subjected to an air-metering force acting in a direction to open the valve and created by Venturi means in the air-intake system and the other of which is subjected to a fuel metering force acting in a direction to close the valve and created by the differential between metered and unmetered fuel in the fuel supply system; means extending axially of the diaphragms connecting the latter to one another and to the fuel valve, said connecting means including a member connected to and movable with the fuel diaphragm and the fuel valve and another member connected to and movable with the air diaphragm, said members being mounted for limited relative movement with respect to one another, an idle spring interposed between said members, means limiting movement of the air diaphragm and its associated member in a direction towards valve closing position, there being a clearance space between said members when such limited position is reached whereby the said spring interposes a mechanical force for that provided by the air-metering force tending to open the valve.

7. In combination with an engine having an air-intake system and a fuel supply system, a pressure-feed carburetor wherein a fuel valve is controlled by a pair of diaphragms one of which is subjected to an air metering force acting in a direction to open the valve and created by Venturi means in the air-intake system and the other of which is subjected to a fuel metering force acting in a direction to close the valve and created by the differential between metered and unmetered fuel in the fuel supply system, means connecting said diaphragms and fuel valve for movement in unison during air flows above a certain predetermined value but permitting the fuel diaphragm to move independently of the air diaphragm at air flows below such value, said connecting means including a member connected to the air diaphragm and defining a hollow chamber and another member connected to the fuel diaphragm and having a portion arranged for sliding movement in said chamber, an idle spring disposed in said chamber and adapted to be compressed when relative movement between said members takes place, means limiting movement of the air diaphragm toward valve closing position, there being a clearance space between said members when such position is reached such as to enable the spring in cooperation with the fuel diaphragm to regulate the valve for idle enrichment.

8. In a device for supplying fuel-air mixture to an engine, a throttle-controlled air-intake passage having means therein for creating a differential pressure varying in relation to mass air flow, a fuel discharge nozzle arranged to discharge fuel under predetermined pressure into the air stream flowing to the engine, a fuel passage for conducting fuel under pressure to said nozzle, a fuel valve arranged to admit unmetered fuel to said passage, means in said fuel passage beyond said valve for metering fuel flowing to said nozzle including a throttle-controlled idle valve adapted to meter fuel in the idling range, means creating a differential between metered and unmetered fuel pressure, means for regulating the said fuel valve including an air diaphragm subjected to the air differential pressures and a fuel diaphragm subjected to the fuel differential pressure, means connecting said diaphragms to said valves in a manner such that the diaphragms act in opposed relation and in unison for air flows exceeding the idling range but act independently of one another for air flows within said range, said connecting means comprising an assembly including an axially movable member secured to the fuel diaphragm and another axially movable member secured to the air diaphragm, an idle spring interposed between said members, a stop adjustable to limit movement of the air diaphragm toward valve-closing position when the engine is throttled to the idling range, there being a predetermined clearance space between said members when such position is reached at which point the idle spring interposes a mechanical force for the air differential pressure in regulating the fuel valve.

9. In an injection carburetor, a fuel valve, an air diaphragm and a fuel diaphragm connected to said valve and adapted to be actuated by air metering and fuel metering pressures varying respectively, in relation to air flow and fuel flow, means connecting said diaphragms to one another and to the fuel valve including a member connected to and movable with the air diaphragm and another member connected to and movable with the fuel diaphragm, said members being adapted to have a telescoping action with respect to one another, a coil spring interposed between said members, an adjustable stop arranged to limit movement of the air diaphragm toward valve closing position, there being a limited clearance between said members when such position is reached at which point the idle spring interposes a mechanical pressure or thrust on the fuel valve in opposition to the fuel diaphragm to maintain the said valve open at idling air flows, said spring being of low spring rate and of relatively great length with respect to the travel of the valve to maintain the head provided thereby substantially constant throughout the idling range.

10. In an injection carburetor, a fuel valve and means for regulating said valve comprising an air diaphragm and a fuel diaphragm connected to said valve and adapted to be actuated by air pressure varying in relation to air flow and fuel pressure varying in relation to fuel flow, means connecting said diaphragms to one another and to the fuel valve including spacer members movable axially in substantially the plane of the fuel valve, one of said members being connected to the fuel diaphragm and the other of said members being connected to the air diaphragm, said members being arranged so that there is a small clearance space therebetween when the air diaphragm is subjected to pressures existing at air flows below a certain value, the space being taken up as the air flows approach and exceed such value, a spring of low rate interposed between said members to provide a mechanical pressure head on the fuel valve when the air flow drops below such value, and an adjustable stop backing up said spring.

11. For use with an injection carburetor, a regulator unit comprising a fuel valve, an air diaphragm and a fuel diaphragm connected to said valve and adapted to be actuated by air pressure varying in relation to air flow and fuel pressure varying in relation to fuel flow, means connecting said diaphragms to one another and to the fuel valve including spacer members one of which is connected to the air diaphragm and another of which is connected to the fuel diaphragm and fuel valve, said members being adapted to have a small clearance space therebetween when the air diaphragm is subjected to pressures existing at air flows below a certain value, a spring of low spring rate supported by one of said members and engaging the other of said members to interpose a mechanical force for the air diaphragm at low air flows, and an adjustable stop for determining the position at which the spring will take effect.

12. In a pressure feed carburetor wherein a main fuel valve is controlled by a plurality of spaced parallel diaphragms subjected to a differential air pressure varying in relation to air flow and a differential fuel pressure varying in relation to fuel flow, an operative connection between said diaphragms and the fuel valve for opening said valve upon increase in the air differential pressure and closing the valve upon increase in fuel differential pressure, said connection including a pair of abutting members, a spring urging the abutting members apart and effective to separate the abutting members at low air flows but ineffective to separate the abutting members at air flows above a predetermined amount, means backing up one of said members at low air flows, and means connecting the other of said members to the fuel valve.

13. In a fuel metering device for an engine having a throttle for controlling power output and a regulator valve for automatically regulating the metering head across a metering restriction, a pair of movable elements for positioning said valve, one of said elements being subjected in a valve closing direction to a force varying with variations in the flow of fuel to the engine and the other element being subjected in a valve opening direction to a force varying in relation to engine speed and/or throttle position, means connecting said elements to one another and said valve in a manner such that the said elements act together but in opposed relation to position the valve when said second named force is above a value corresponding to that produced when the engine is operating at a speed above a predetermined low or idling range and separate for action independently of one another when said second named force is at a value corresponding to that produced when the engine is operating at a speed within said low range, and spring means associated with said connecting means and acting automatically to substitute a substantially constant mechanical force for the said second named force during operation within the predetermined low speed range when said elements are separated and to become completely ineffective immediately upon said elements moving together for operation beyond said low speed range.

14. A fuel metering device as claimed in claim 13 wherein said connecting means includes a pair of slidingly telescoped members and said spring means consists of a coil spring interposed therebetween, said telescoping members moving into abutting engagement when said second named force is above a value corresponding to that produced when the engine is operating at a speed above the said predetermined low speed range and moving out of abutting engagement due to the force of said spring when said second named force is at a value corresponding to that produced when the engine is operating at a speed within said low speed range.

FRANK C. MOCK.

REFERENCES CITED

The following references are of record in the file of this patent:

UNITED STATES PATENTS

| Number | Name | Date |
|---|---|---|
| 1,504,507 | Richardson | Aug. 12, 1924 |
| 1,504,508 | Richardson | Aug. 12, 1924 |
| 1,799,426 | Land | Apr. 7, 1931 |
| 2,186,480 | Ensign | Jan. 9, 1940 |
| 2,283,021 | Udale | May 12, 1942 |
| 2,297,213 | Gosslau | Sept. 29, 1942 |
| 2,324,599 | Schorn | July 20, 1943 |
| 2,361,227 | Mock | Oct. 24, 1944 |
| 2,361,993 | Chandler | Nov. 7, 1944 |
| 2,372,306 | Adair | Mar. 27, 1945 |
| 2,391,755 | Twyman | Dec. 25, 1945 |

FOREIGN PATENTS

| Number | Country | Date |
|---|---|---|
| 542,761 | Great Britain | Jan. 27, 1942 |

OTHER REFERENCES

Ser. No. 394,322, Gosslau et al. (A. P. C.) pub. May 25, 1943.